(12) United States Patent
Johanski et al.

(10) Patent No.: US 10,610,339 B2
(45) Date of Patent: Apr. 7, 2020

(54) DOCKING AND CHARGING STATION AND FILLING OPERATION FOR A HAND-HELD ORAL CLEANING DEVICE

(71) Applicant: KONINKLIJKE PHILIPS N.V., Eindhoven (NL)

(72) Inventors: Brian Johanski, Snohomish, WA (US); Lewis McFadyen, Hong Kong (CN)

(73) Assignee: KONINKLIJKE PHILIPS N.V., Eindhoven (NL)

(*) Notice: Subject to any disclaimer, the term of this patent is extended or adjusted under 35 U.S.C. 154(b) by 292 days.

(21) Appl. No.: 15/545,383

(22) PCT Filed: Dec. 18, 2015

(86) PCT No.: PCT/IB2015/059757
§ 371 (c)(1),
(2) Date: Jul. 21, 2017

(87) PCT Pub. No.: WO2016/124997
PCT Pub. Date: Aug. 11, 2016

(65) Prior Publication Data
US 2018/0000572 A1    Jan. 4, 2018

Related U.S. Application Data

(60) Provisional application No. 62/112,211, filed on Feb. 5, 2015.

(51) Int. Cl.
*A61C 17/02* (2006.01)
*B67D 7/02* (2010.01)

(52) U.S. Cl.
CPC ...... *A61C 17/0205* (2013.01); *A61C 17/0202* (2013.01); *B67D 7/0288* (2013.01); *B67D 7/0294* (2013.01)

(58) Field of Classification Search
CPC ............ A61C 17/0205; A61C 17/0202; B67D 7/0294; B67D 7/0288
See application file for complete search history.

(56) References Cited

U.S. PATENT DOCUMENTS 5,346,324 A * 9/1994 Kuo ................... A46B 11/0055
                                                          401/146
5,769,324 A    6/1998 Lenhart
(Continued)

FOREIGN PATENT DOCUMENTS

JP     H04306452 A    10/1992
KR     101410048 B1    6/2014

*Primary Examiner* — Nicolas A Arnett

(57) ABSTRACT

A docking and charging station (100) for use in conjunction with a hand-held fluid droplet appliance (10) for dental cleaning, the docking and charging station (100) comprising a charging base (102) for recharging the hand-held fluid droplet appliance, a reservoir (110) for holding a larger amount of liquid (112) than can be held in a chamber of the hand-held fluid droplet appliance, and a docking refilling alignment mechanism for properly aligning and securing the hand-held fluid droplet appliance in the cradle (160) of the docking and charging station when the hand-held fluid droplet appliance is mounted into the docking and charging station to prevent spillage, leaking or non-refilling of the appliance from the reservoir if there is not proper alignment.

15 Claims, 6 Drawing Sheets

(56) References Cited

U.S. PATENT DOCUMENTS

Figure 1A:
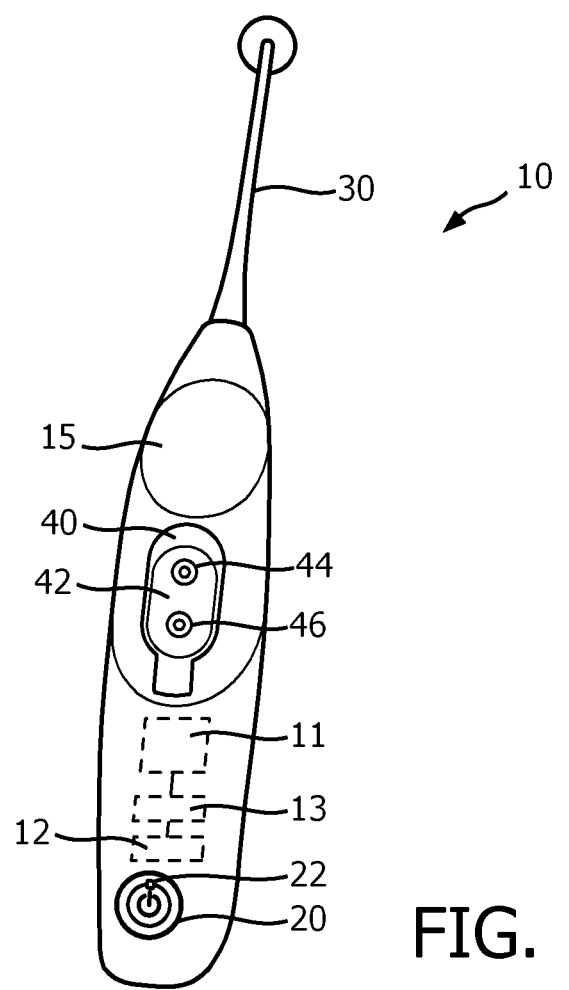
Figure 1B:
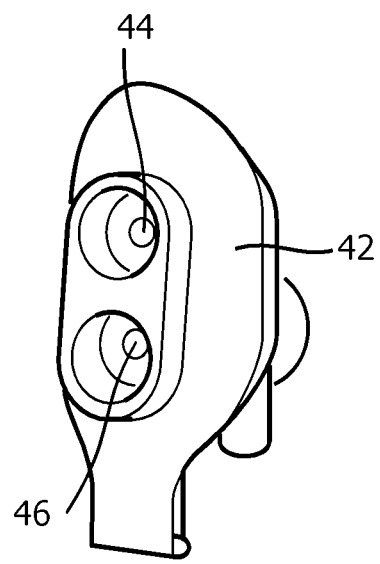

| | | | |
|---|---|---|---|
| 6,622,333 B1* | 9/2003 | Rehkemper | A61C 17/30 15/22.1 |
| 6,644,878 B2* | 11/2003 | Hall | A61C 17/36 401/146 |
| 7,080,980 B2* | 7/2006 | Klupt | A61C 17/222 15/167.1 |
| 7,264,026 B2* | 9/2007 | Gruber | A46B 11/063 141/113 |
| 8,317,424 B2* | 11/2012 | Chenvainu | A61C 1/0061 401/188 R |
| 9,980,793 B2* | 5/2018 | Wagner | A61C 17/0202 |
| 10,357,345 B2* | 7/2019 | Challa | A61C 17/0202 |
| 2002/0129454 A1 | 9/2002 | Hilscher et al. | |
| 2004/0118427 A1* | 6/2004 | Palfy | A61C 17/036 134/1 |
| 2005/0271531 A1* | 12/2005 | Brown, Jr. | A61C 1/0061 417/474 |
| 2005/0272001 A1 | 12/2005 | Blain et al. | |
| 2005/0272002 A1 | 12/2005 | Chenvainu et al. | |
| 2006/0078844 A1* | 4/2006 | Goldman | A61C 1/0084 433/80 |
| 2010/0209870 A1 | 8/2010 | Thomas et al. | |
| 2012/0021375 A1 | 1/2012 | Binner et al. | |
| 2014/0038127 A1* | 2/2014 | Gatzenneyer | A61C 17/0202 433/82 |

\* cited by examiner

DOCKING AND CHARGING STATION AND FILLING OPERATION FOR A HAND-HELD ORAL CLEANING DEVICE

CROSS-REFERENCE TO PRIOR APPLICATIONS

This application is the U.S. National Phase application under 35 U.S.C. § 371 of International Application No. PCT/IB2015/059757, filed on Dec. 18, 2015, which claims the benefit of U.S. Provisional Patent Application No. 62/112,211, filed on Feb. 5, 2015. These applications are hereby incorporated by reference herein.

BACKGROUND

With oral healthcare, one generally thinks of simply brushing one's teeth. However, brushing of one's teeth, alone, does not clean interproximal areas of the teeth very well. Accordingly, dentists recommend flossing or other mechanisms in addition to brushing for improved cleaning of the interproximal spaces. Several oral cleaning devices are on the market that can be used at home. Oral cleaning devices using a spray of liquid droplets to clean dental regions of the teeth, including interproximal areas, are known. In many such appliances, a stream of high velocity gas is used to create the liquid droplets when liquid is brought into contact with the air stream, such as by a pump or other arrangement. One such device for home use is the Philips Sonicare AirFloss™ flosser (manufactured by Koninklijke Philips Electronics, N.V.). While the system is effective, one comment by users is that the chamber of fluid in the hand-held fluid droplet appliance needs intermittent refilling with water, mouthwash or other fluid, typically after just a few cleanings.

Accordingly, it would be desirable to have a mechanism for refilling the hand-held oral cleaning device with additional fluid easily between uses, while also enabling charging of the hand-held fluid droplet appliance.

SUMMARY OF THE INVENTION

Accordingly there is disclosed herein a docking and charging station for use in conjunction with a hand-held oral cleaning device, the docking and charging station comprising, a reservoir for holding a larger amount of fluid than can be held in the chamber of the hand-held device, and a mechanism for properly aligning and securing the hand-held fluid droplet appliance into the reservoir on the docking and charging station when the hand-held fluid droplet appliance is mounted into the docking and charging station to prevent spillage, leaking, or non-refilling of the appliance from the reservoir if there is not proper alignment. The docking and charging station also includes a charging base for recharging the hand-held fluid droplet appliance when it is secured into the docking and charging station.

Generally, in one aspect, a docking and charging station for receiving, charging and filling a hand-held fluid droplet appliance for dental cleaning, the docking and charging station is provided. The docking and charging station includes a base having a pump, a reservoir for holding liquid that has a male fill port for delivering liquid and a second male more that provides a liquid and air exit interface. The two male ports are configured to engage two respective female ports into the chamber of holding fluid of a hand-held fluid droplet appliance when it is properly positioned in a cradle in the docking and charging station. When the male and female ports of the two devices are properly aligned, a docking refilling alignment mechanism on the docking and charging station allows the cradle holding the hand-held appliance to be connected to reservoir so that liquid is pumped from the reservoir through the conjoined fill ports into the chamber of the hand-held fluid droplet appliance, and air and excess liquid can exit the chamber to the reservoir through the conjoined liquid and air exit interface ports.

According to an embodiment, the base has a charging mechanism for charging the hand-held fluid droplet appliance when it is properly seated in the cradle of the docking and charging station and the docking refilling alignment mechanism is engaged.

According to an embodiment, flexible sealing mechanisms surround the male ports of the docking and charging station to prevent leakage or spilling.

According to an embodiment, at least one safety mechanism is provided to prevent the refilling operation when the male and female ports are not properly aligned and engaged.

According to an embodiment, the at least one safety mechanism is coupled to the first port.

According to an embodiment, the safety mechanism is one of a check valve or a micro switch.

According to an embodiment, the liquid in the reservoir can be at least one of water, mouthwash, or antimicrobial fluid.

According to an embodiment, a release button is provided on the docking and charging station for disengaging the docking refilling alignment mechanism so that the hand-held fluid droplet appliance can be removed from the docking and charging station cradle for use after it is refilled.

According to another aspect, a method of using a docking and charging station to refill a chamber of a hand-held fluid droplet appliance from a reservoir on the docking and charging station is provided. The hand-held fluid droplet appliance is inserted into a cradle of the docking and charging station such that the first and second female ports on the chamber door of the appliance are inserted in a slot in the cradle so as to align with the first and second male ports on the reservoir of the docking and charging station. When the ports are properly aligned, a docking refilling alignment mechanism allows the cradle to be pushed into position so that the male ports on the docking and charging station are connected into the female ports on the hand-held fluid droplet appliance chamber door, and liquid is pumped from the reservoir on the docking and charging station into the chamber of the hand-held fluid droplet appliance, while air and any excess liquid from the chamber of the hand-held fluid droplet appliance is evacuated through the conjoined male and female liquid and air exit interface ports into the reservoir.

According to another aspect a safety mechanism, such as a micro switch or check valve is provided to prevent operation when the male ports and female ports are not properly aligned and engaged.

According to another aspect, the docking and charging station includes a charging mechanism that can charge a battery in the hand-held fluid droplet appliance when the hand-held fluid droplet appliance is positioned in the cradle and the docking refilling alignment mechanism is engaged. The charging mechanism will shut off automatically when the battery in the hand-held fluid droplet appliance is fully charged.

According to another aspect, when the hand-held fluid droplet appliance has been refilled from the reservoir on the docking and charging station, pressing a release button will disengage the docking refilling alignment mechanism so the hand-held fluid droplet appliance can be removed from the docking and charging station for use.

BRIEF DESCRIPTION OF THE FIGURES

FIG. 1A is a view of a hand-held fluid droplet appliance as described herein.

FIG. 1B is a detailed view of the chamber cover of the hand-held fluid droplet appliance.

FIG. 2A is a front view of the docking refilling alignment mechanism of the present invention as seen through the cradle of the docking and charging station.

FIG. 2B is a top view of the docking and charging station of the present invention showing the reservoir, release button, docking refilling alignment mechanism, and cradle.

FIG. 3 is a side view of the docking and charging station of the present invention with the hand-held fluid droplet appliance mounted thereon for refilling and charging.

FIGS. 4A, and 4B are top and side views of the hand-held fluid droplet appliance inserted in the cradle of the docking and charging station of the present invention, but the cradle has not yet been snapped into the reservoir by means of the docking refilling alignment mechanism.

FIGS. 5A and 5B are top and cut-away side views of the hand-held fluid droplet appliance in the cradle of the docking and charging station of the present invention, with the cradle snapped into place by means of the docking refilling alignment mechanism such that the hand-held fluid droplet appliance is connected to reservoir of the docking and charging station for refilling.

DETAILED DESCRIPTION OF THE INVENTION

The present invention pertains to a docking and charging station 100 for hand-held fluid droplet appliance 10 as described and shown herein which produces a spray of liquid droplets which is used to clean the interproximal spaces between teeth. FIG. 1A shows a hand-held fluid droplet appliance 10 which uses a mechanical system to create a liquid droplet spray for oral cleaning. The appliance includes a motor 11 powered by a battery 12. A control unit 13 is included between the battery 12 and the motor 11 for control of the operation of the appliance. In operation, the hand-held fluid droplet appliance 10 is turned on or off with a power button 20. The power button 20 typically includes an illuminated portion 22 that is used to indicate that the hand-held fluid droplet appliance is on, or is being charged. The hand-held fluid droplet appliance 10 includes an elongated nozzle 30 which extends outwardly from the appliance, through which a spray of liquid droplets is directed through an orifice for cleaning action against dental regions of the teeth and other areas of the oral cavity. A chamber 40 for water or other liquid is also present in the hand-held fluid droplet appliance 10. Liquid in the chamber 40 is mixed with air and propelled out through the orifice within the nozzle 30. The chamber 40 can be refilled manually by opening the door 42 to the chamber and pouring in liquid from a container or direct from a fluid source (i.e. a water faucet). Additionally, the hand-held fluid droplet appliance 10 can also be filled automatically when connected to a docking and charging station 100 of the present invention (shown in FIG. 2) that has a reservoir 110 for holding a larger amount of fluid.

FIG. 1B provides a more detailed view of the door 42 of the chamber 40 in the hand-held fluid droplet appliance 10. The chamber door 42 is configured to have a first female port 44 that is a liquid inlet, and a second female port 46 that is a liquid and air exit interface for refilling the chamber 40 when the hand-held fluid droplet appliance 10 is connected to the docking and charging station 100 of the present invention. The dual-port arrangement allows for a recirculating fill flow.

As disclosed herein, the present invention pertains to a docking and charging station 100 for the hand-held fluid droplet appliance 10, as shown in FIGS. 2A, 2B, 3, 4A, 4B, 5A and 5B. The docking and charging station 100 includes a reservoir 110, a cradle 160 for holding the hand-held fluid droplet appliance 10, a docking refilling alignment mechanism 130, a release button 120, a vent and fill mechanism having two male ports, 144, 146 and a base 102 containing a pump 104 and a charging mechanism 106.

FIG. 2A shows the cradle 160 for holding the hand-held fluid droplet appliance. The cradle 160 is shaped and configured such that the hand-held fluid droplet appliance 10 can only be properly inserted in one direction, to help ensure alignment of the hand-held fluid droplet appliance. As can also be clearly seen in FIG. 2A, the fill interface mechanism consists of the two male ports 144 and 146 on the docking and charging station 100, which engage the two respective female ports 44, 46 on the chamber door 42 of the hand-held fluid droplet appliance 10 when it is properly inserted in the cradle 160 of the docking and charging station 100. The first male port 144 is typically a liquid inlet interface which allows liquid to flow from the reservoir 110 on the docking and charging station 100 through the first female port 44 into the chamber 40 of the hand held fluid droplet appliance 10. The second male port 146 is typically the liquid and air exit interface which is linked to the second female port 46 in the chamber door 42. The second female port 46 has a snorkel system 80 connected to it that enables evacuation of air at the top of the chamber 40 to be evacuated while liquid is being delivered into the chamber 40 from the reservoir 110. The liquid and air exit interface also provide for an exit for overflow liquid if the chamber 40 is over filled, or if the fluid in the chamber is circulated at intervals to keep it aerated to prevent growth of bacteria. It can be appreciated that while the arrangement shown in the figures of this application indicate upper and lower male ports 144, 146, other arrangements are also possible, such as the ports being arranged side by side, or in other configurations, so long as there is alignment between the female ports 44, 46 of the chamber door 42 with the male ports 144, 146 of the docking and charging station 100 of the present invention.

In FIG. 2B, the reservoir 110 of the docking and charging station 100 for holding water, mouthwash, antimicrobial fluids, or other liquids 112 can be clearly seen. A pump 104, see in FIGS. 3 and 5B for pumping liquid out of the docking and charging station reservoir 110 into the chamber 40 of the hand-held fluid droplet appliance 10 is also part of the docking and charging station 100. The docking refilling alignment mechanism 130 of the docking and charging station can also be seen clearly in FIG. 2B, extending from the front of the cradle on both sides into the reservoir mechanism to ensure proper alignment of the cradle 160 and the hand-held fluid droplet appliance 10 contained therein with the reservoir, so that female ports 44, 46 on the hand held fluid droplet appliance 10 are properly aligned with the male ports 144, 146 (seen in FIG. 4B) to ensure proper filling and no leakage around the seal of the ports. The male ports 144, 146 are typically surrounded by a flexible rubber sealing mechanism, O-ring or other device 154, 156, respectively, that helps prevent leaking of fluid through the male ports 144, 146.

Figure 3:
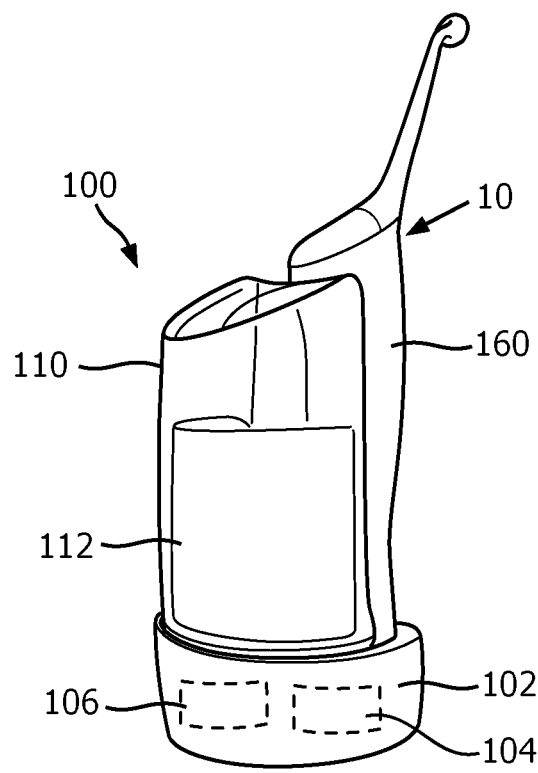
Figure 5A:
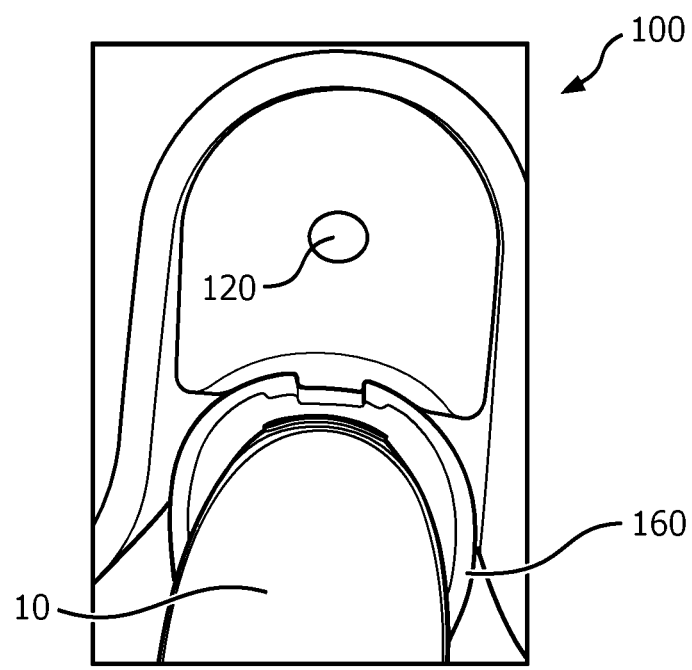

FIG. 3 is a view of the docking and charging station 100 of the present invention with a hand-held fluid droplet appliance 10 in the cradle 160 of the docking and charging station. The reservoir 110 is partially filled with liquid 112. The reservoir 110 is a larger container for holding water, mouthwash, antimicrobial fluids, or other liquids 112, and a pump 104 in the base 102 of the docking and charging station 100 is used for pumping liquid out of the docking and charging station reservoir 110 through the port 144 into the chamber 40 of the hand held fluid droplet appliance 10. When the hand-held fluid droplet appliance 10 is snapped into the cradle 160 of docking and charging station 100, liquid 112 from the docking and charging station reservoir 110 can be used to fill the chamber 40 on the hand-held fluid droplet appliance 10, and refilling will shut off when the chamber 40 is full. While the hand-held fluid droplet appliance 10 is properly snapped into the cradle 160 of the docking and charging station 100 (as seen in FIG. 5A), it will also be recharged if necessary by means of the charging mechanism 106. The charging mechanism is designed to correspond with the charging receptacle in the base of the hand-held fluid droplet appliance 10, so that when the appliance 10 is properly seated in the cradle 160 of the docking and charging station 100 and engaged, the charging mechanism can charge the battery 12 of the hand-held fluid droplet appliance 10. The charging mechanism 106 of the docking and charging station 100 will automatically shut itself off when the battery 12 of the hand-held fluid droplet appliance 10 is fully charged. In one arrangement of the present invention, if the hand-held fluid droplet appliance 10 remains snapped into the cradle 160 of the docking and charging station 100 for a predefined period of time, the docking and charging station 100 may recirculate liquid 112 from the reservoir 110 into the chamber 40 to keep fluid in both the chamber and reservoir from becoming stagnant, even if the chamber 40 has been refilled previously.

Figure 2A:
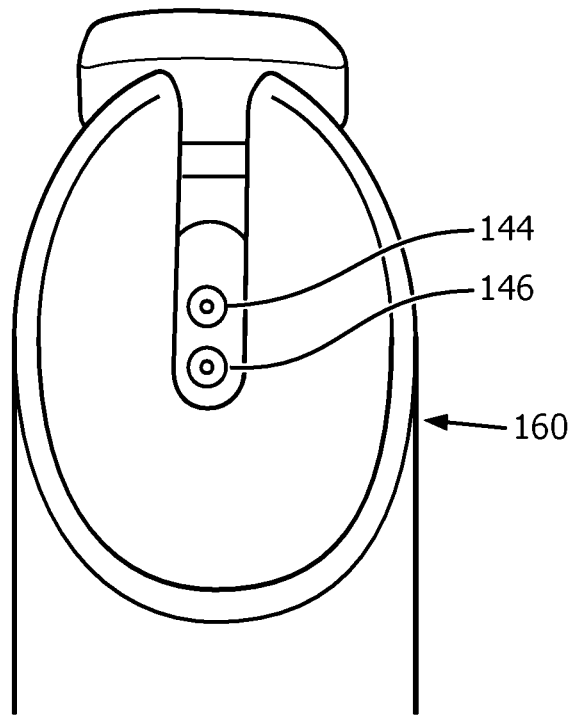
Figure 4A:
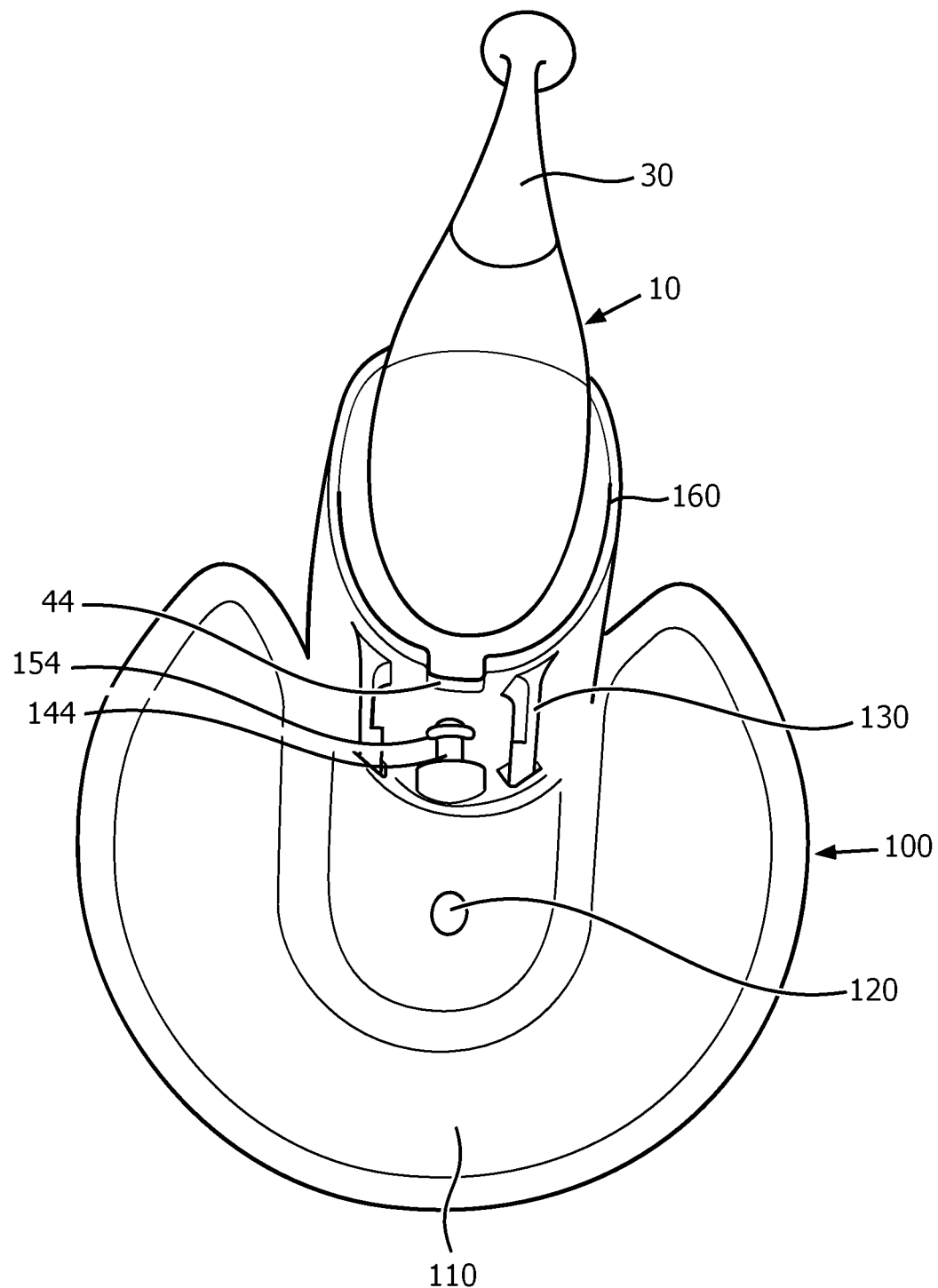
Figure 4B:
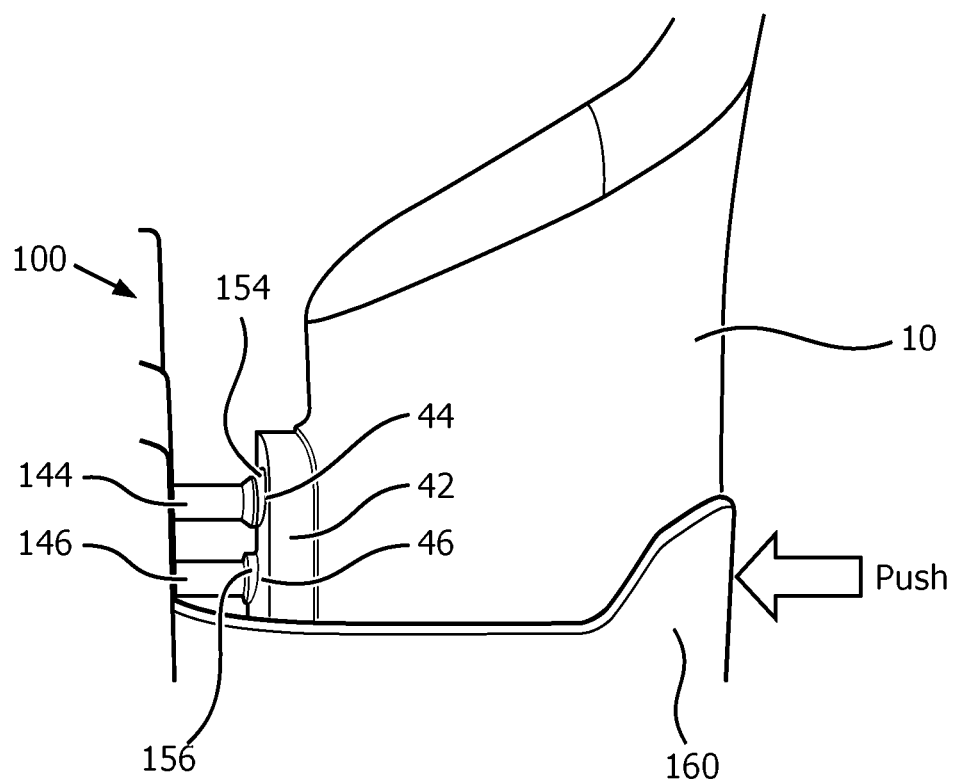

FIGS. 4A and 4B show the hand-held fluid droplet appliance 10 inserted into the cradle 160 of the docking and charging station 100 of the present invention. The cradle 160 is configured shaped and size such that the hand-held fluid droplet appliance can only be inserted one way so that the first and second female ports 44, 46 on the door 42 of the chamber 40 of the hand-held fluid droplet appliance 10 slide into the cutout portion of the cradle 160. The cut-out portion of the cradle can be clearly seen in FIG. 2A. It is of the proper depth and length that when the hand-held fluid droplet appliance 10 is inserted in the cradle 160, such as can be seen in FIG. 4A, the closed chamber door 42 of the hand-held fluid droplet appliance 10 is positioned such that the female ports 44, 46 of the chamber door 42 of the hand held fluid droplet appliance 10 align with the male ports, 44, 46, respectively, of the docking and charging station 100. If the hand-held fluid droplet appliance 10 is not properly inserted into the cradle 160 of the docking and charging station 100, or the chamber door 42 of the hand-held fluid droplet appliance 10 is not fully and properly closed, the female ports 44, 46 of the chamber door 42 will not properly align with the male ports 144, 146, respectively, of the docking and charging station 100.

FIG. 4B is a view with part of the docking and charging station docking refilling alignment mechanism 130 and cradle 160 cut away so that both the male ports 144, 146 of the docking and charging station 100 can be seen. Additionally, the chamber door 42 of the hand-held fluid droplet appliance 10 is exaggerated to protrude further outward from the hand-held fluid droplet appliance 10 so the alignment with the female ports 44, 46 of the chamber door 42 can be clearly seen. Because the ports are used for the transfer of liquid, the male ports 144, 146 are further sealed with a flexible sealing mechanism 154, 156, respectively, for additional protection against leakage. The top view of FIG. 4A is of a typical hand-held fluid droplet appliance and docking mechanism without the cut-away portions and distortions of FIG. 4B provided for greater understanding.

Figure 2B:
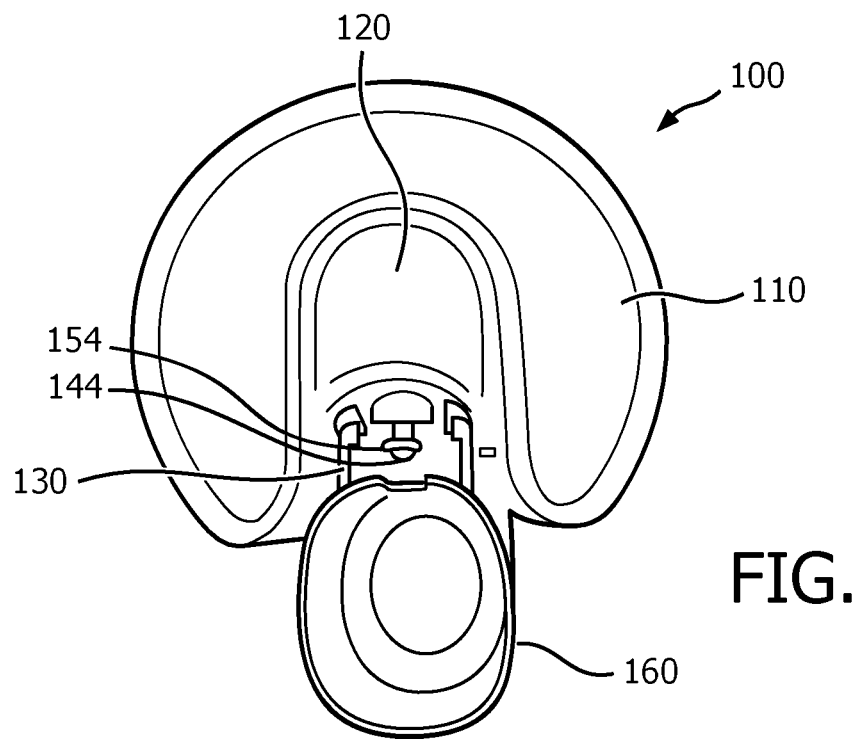

Once the hand-held fluid droplet appliance 10 is properly inserted in the cradle 160 such that the female ports 44, 46 in the chamber door 42 are positioned in the cut-out portion of the cradle 160, and aligned with the male ports 144, 146 of the docking and charging station 100, the user can simply push on the outside of the cradle 160, as shown by the arrow in FIG. 4B. When this happens, the docking refilling alignment mechanism 130, which can be seen in FIGS. 2B and 4A snaps into a closed position as seen in FIG. 5A. This moves the hand-held fluid droplet appliance 10 into fluid connection with the fill mechanism of the docking and charging station reservoir 110. When this is done, the first male port 144 of the docking and charging station 100 is received into the first female port 44 of the hand-held fluid droplet appliance chamber door 42, and the second male port 146 of the docking and charging station 100 is received into the second female port 46 of the hand-held fluid droplet appliance 10. If the hand-held fluid droplet appliance 10 is not properly seated in the cradle 160 of the docking and charging station 100 such that the female ports 44, 46 of the appliance 10 are not aligned with the male ports 144, 146 of the docking and charging station 100, the docking refilling alignment mechanism 130 will not snap into the closed position, and the refilling and recharging operations will not commence. This serves to prevent spillage or leaking of fluid.

Figure 5B:
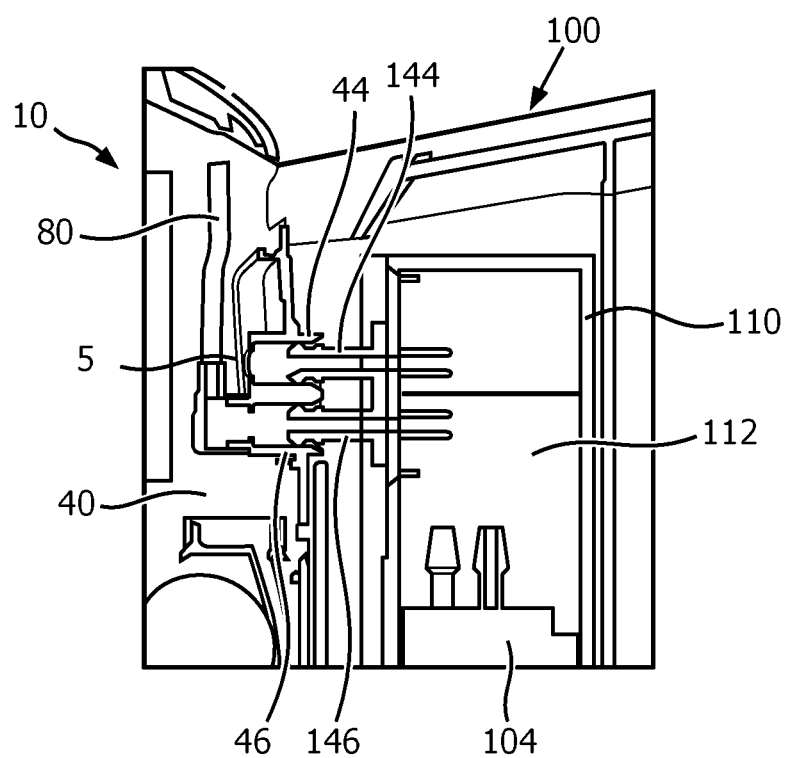

FIG. 5B shows a side cut-away view of the hand-held fluid droplet appliance 10 (on the left) connected to the reservoir 110 of the docking and charging station 100 when the two components are fully aligned and connected to each other. The fill interface mechanism consists of the docking and charging station 100 consists of the two male ports 144 and 146 on the docking and charging station 100 of the present invention, which engage the two respective female ports 44, 46 of the hand-held fluid droplet appliance 10. The dual-port arrangement allows for a recirculating fill flow. One set of ports 44,144 is a liquid inlet interface which allows liquid to flow through the first female port 44 when the safety mechanism 55 is open, and it typically has an O-ring or flexible rubber sealing mechanism 154 around the first male port 144 to prevent leakage. The second set of ports 46, 146 is the liquid and air exit interface. As disclosed herein, in order for the chamber 40 on the hand-held fluid droplet appliance 10 to be refilled effectively from the larger reservoir 110 on the docking and charging station 100 when the hand-held fluid droplet appliance 10 is connected to the docking and charging station 100, there needs to be a way to vent the chamber 40 in the hand-held fluid droplet appliance 10 to allow for filling of the chamber 40 from the reservoir 110 in the docking and charging station 100. When the hand-held fluid droplet appliance 10 is properly connected into the docking and charging station 100 as shown in FIG. 5B, liquid 112 is delivered into the chamber 40 from the reservoir 110 through the liquid inlet interface created when ports 144 and 44 are connected; safety mechanism 55 only allows liquid to flow through the conjoined ports 44, 144 when the safety mechanism 55 is open, serving as an additional protection against spills or leakage. The snorkel system 80 is connected female port 46. The top end of the snorkel system 80 rests at the top of the chamber 40. This allows for air at the top of the chamber 40 to be evacuated through connected ports 46, 146 into the reservoir while new liquid is being delivered into the lower portion of the chamber 40. This arrangement allows displaced air and over-fill liquid to return to the reservoir 110 in the docking and charging station 100 during filling operations. Therefore, no device is needed for detecting the fluid level in the chamber 40 of the hand-held fluid droplet appliance 10. The system may also typically have at least one additional safety mechanism in addition to the cradle and docking refilling alignment mechanism 130 to ensure the pump 104 in the docking and charging station reservoir 110 will only operate when the hand-held fluid droplet appliance 10 is properly engaged to the docking and charging station 100 to prevent accidental spillage. This is typically a check valve, micro switch, or other safety mechanism 55 to close the port and prevent leakage or overflow and allow operation only when the hand held fluid droplet appliance 10 is properly docked to the docking and charging station 100. The vent and liquid and air exit mechanism, in addition to providing a way to vent the chamber in the hand-held fluid droplet appliance to allow for filling from the reservoir of the docking and charging station will also return over-fill liquid to the reservoir in the docking and charging station during filling operations. Therefore, no device is needed for detecting the fluid level in the chamber of the hand-held fluid droplet appliance to shut off the refilling feature.

When the user is ready to use the hand-held fluid droplet appliance 10 after it has been refilled and/or recharged, s/he simply presses on the release button 120 at the top of the docking and charging station 100 (shown in FIGS. 4A and 5A), to release the docking refilling alignment mechanism 130. This disengages the cradle 160 from the reservoir 110, thereby also disengaging the male ports 144, 146 of the docking and charging station 100 from the female ports 44, 46 on the chamber door 42 of the hand-held fluid droplet appliance 10. The user can then pick up the hand-held fluid droplet appliance 10 out of the cradle 160 and turn it on to begin use. When finished, the user can simply reinsert the hand-held fluid droplet appliance 10 back into the cradle 160 of the docking and charging station 100 and snap the cradle 160 into the closed position for additional automatic refilling and recharging.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A docking and charging station for receiving, charging and filling a hand-held fluid droplet appliance for dental cleaning, the docking and charging station comprising:
   a base having a pump; and
   a reservoir for holding liquid, the reservoir having a first male fill port for delivering liquid and a second male port forming a liquid and air exit interface, the male ports configured to engage two respective female ports in the hand-held fluid droplet appliance when the hand-held fluid droplet appliance is properly positioned in a cradle of the docking and charging station such that when the male and female ports are properly aligned, a docking refilling alignment mechanism allows the hand held appliance positioned in the cradle to be fluidly connected to the reservoir such that liquid is pumped by means of the pump from the reservoir through conjoined fill ports into a chamber of the hand-held fluid droplet appliance, and air and excess liquid exits the chamber to the reservoir through conjoined exit ports.

2. The docking and charging station of claim 1, wherein the base further comprises a charging mechanism for charging the battery of the hand-held fluid droplet appliance when it is properly seated in the cradle of the docking and charging station and the docking refilling alignment mechanism is engaged.

3. The docking and charging station of claim 1, further comprising flexible sealing mechanisms surrounding first male port and second male port respectively.

4. The docking and charging station of claim 1, further comprising at least one safety mechanism to prevent operation when the male ports and female ports are not properly aligned and engaged.

5. The docking and charging station of claim 4 wherein the at least one safety mechanism is coupled to the first port.

6. The docking and charging station of claim 4 wherein the safety mechanism is one of a check valve or a micro switch.

7. The docking and charging station of claim 1 wherein the liquid in the reservoir is at least one of water, mouthwash, or antimicrobial fluid.

8. The docking and charging station of claim 1 further comprising a release button for disengaging the docking refilling alignment mechanism.

9. The docking and charging station of claim 8 wherein the hand-held fluid droplet appliance can only be removed from the cradle when the docking refilling alignment mechanism has been disengaged by means of the release button.

10. A method of using a docking and charging station having a pump, a reservoir having first and second male ports, a cradle, and a docking refilling alignment mechanism for automatically filling a chamber of a hand-held fluid droplet appliance suitable for dental cleaning, comprising the steps of:
    placing the hand-held fluid droplet appliance into the cradle of the docking and charging station;
    aligning the first and second male ports of the reservoir of the docking and charging station with respective first and second female ports on a door of the chamber of the hand-held fluid droplet appliance;
    pressing on the cradle to engage the docking refilling alignment mechanism such that the male ports of the reservoir of the docking and charging station engage the respective female ports;
    pumping liquid from the reservoir on the docking and charging station through the conjoined male and female inlet ports into the chamber of the hand-held fluid droplet appliance; and
    evacuating air and any excess liquid from the chamber of the hand-held fluid droplet appliance to the reservoir through the conjoined male and female liquid and air exit interface ports.

11. The method of claim 10 further comprising at least one safety mechanism is provided to prevent operation when the male ports and female ports are not properly aligned and engaged.

12. The method of claim 11 wherein the safety mechanism is one of a check valve or a micro switch.

13. The method of claim 10 further comprising charging a battery in the hand-held fluid droplet appliance from a charging mechanism in the base of the docking and charging station when the hand-held fluid droplet appliance is positioned in the cradle and the docking refilling alignment mechanism is engaged.

14. The method of claim 13 wherein the charging mechanism shuts off when the battery in the hand-held fluid droplet appliance is fully charged.

15. The method of claim 10 further wherein pressing a release button will disengage the docking refilling alignment mechanism so the hand-held fluid droplet appliance can be removed from the docking and charging station for use.

\* \* \* \* \*